(12) United States Patent
Taima (10) Patent No.: US 8,788,110 B2
(45) Date of Patent: Jul. 22, 2014

(54) ELECTRIC POWER VISUALIZATION METHOD AND ELECTRIC POWER VISUALIZATION DEVICE

(75) Inventor: Kenji Taima, Moriguchi (JP)

(73) Assignee: Sanyo Electric Co., Ltd. (JP)

( * ) Notice: Subject to any disclaimer, the term of this patent is extended or adjusted under 35 U.S.C. 154(b) by 315 days.

(21) Appl. No.: 13/416,506

(22) Filed: Mar. 9, 2012

(65) Prior Publication Data

US 2012/0173034 A1   Jul. 5, 2012

Related U.S. Application Data (63) Continuation of application No. PCT/JP2011/069262, filed on Aug. 26, 2011.

(30) Foreign Application Priority Data

Sep. 8, 2010 (JP) ................................ 2010-201146

(51) Int. Cl.
    *H02J 3/14* (2006.01)
(52) U.S. Cl.
    USPC .......................................... 700/297; 700/286
(58) Field of Classification Search
    None
    See application file for complete search history.

(56) References Cited

U.S. PATENT DOCUMENTS 6,885,914 B2 * 4/2005 Shimode et al. .............. 700/288
2010/0060479 A1  3/2010 Salter

FOREIGN PATENT DOCUMENTS

| JP | 2001-184406 A | 7/2001 |
| JP | 2001-197751 A | 7/2001 |
| JP | 2005-284420 A | 10/2005 |
| JP | 2006-140094 A | 6/2006 |
| JP | 2008-136259 A | 6/2008 |
| JP | 2010-518795 A | 5/2010 |

OTHER PUBLICATIONS

International Preliminary Report on Patentability for International Application No. PCT/JP2011/069262, mailed Mar. 21, 2013.
Written Opinion of the International Searching Authority for International Application No. PCT/JP2011/069262, mailed Nov. 29, 2011.

* cited by examiner

*Primary Examiner* — Ryan Jarrett
(74) *Attorney, Agent, or Firm* — Cantor Colburn LLP (57) ABSTRACT

A house uses solar light generated electric power and external commercial electric power and consumes the electric power with a household electronics load or the like. The house includes an electricity storage device and an electric power management device. The electric power management device further has a function to calculate transition of the load electric power, transition of the solar battery generated electric power, and transition of a leveled external commercial electric power during one day, classify the electric power by the power generation methods, apply a green index serving as a standardized index which is defined in advance to each power generation method to calculate an electric power green index, and display a result thereof on a display unit.

12 Claims, 5 Drawing Sheets

ELECTRIC POWER VISUALIZATION METHOD AND ELECTRIC POWER VISUALIZATION DEVICE

The present application is a continuation application of International Application No. PCT/JP2011/069262, filed Aug. 26, 2011, the entire contents of which are incorporated herein by reference and priority to which is hereby claimed. The PCT/JP2011/069262 application claimed the benefit of the date of the earlier filed Japanese Patent Application No. 2010-201146, filed Sep. 8, 2010, the entire contents of which are incorporated herein by reference, and priority to which is hereby claimed.

TECHNICAL FIELD

The present invention relates an electric power visualization method and an electric power visualization device, and in particular to an electric power visualization method and an electric power visualization device which visualizes a composition of electric power when the electric power is composed of electric power generated by a plurality of power generation methods.

BACKGROUND ART

In electric power management, it is preferable to efficiently generate power and send power according to a power consumption of a load. For example, Patent Literature 1 discloses a power supply system of a network system comprising a plurality of solar light generated power supply systems connected to a communication line, and an information source device which measures weather information such as an amount of solar radiation, and transmits the weather information to the solar light generated power supply system. With such a structure, a load device can be efficiently driven based on the amount of power generation which is predicted with a high precision.

Patent Literature 2 discloses a monitoring device for power consumption of a utility wherein information is received from a smart meter system and a transceiver, and a power usage status, a power consumption cost, and power consumption rate are visually displayed through a light-emitting display.

When the power consumption of the load changes, the peak electric power may become excessive, and the electric power fees may become expensive, and in addition, a situation may occur in which the supply of electric power cannot handle the peak electric power. An electricity storage device can be used to average the supply and demand of the electric power. As the electricity storage device, a secondary battery such as a lithium ion battery may be used.

Patent Literature 3 discloses a management device of a lithium ion battery wherein a state of charge/discharge of a lithium ion battery is judged based on a measured value of a charge/discharge current of the lithium ion battery, a measured value of the temperature of the battery, and information of supply of electricity of a commercial power supply, and a remaining capacity of the lithium ion battery is calculated.

RELATED ART REFERENCES

Patent Literature

[Patent Literature 1] JP 2008-136259 A
[Patent Literature 2] JP 2010-518795 A
[Patent Literature 3] JP 2006-140094 A

DISCLOSURE OF INVENTION

Technical Problem

As an eco-friendly electric power supply, the use of solar light generated electric power by a solar battery has been developed. The solar light power generation can supply generated electric power during the period of sunshine, but cannot generate power when there is no sunshine. Therefore, in order to efficiently use the generated power of the solar light power generation throughout one day, an electricity storage device is used. In this case also, when the electric power is insufficient compared to the necessary electric power, supply of electric power is received from an external commercial power supply. The external commercial power supply supplies to a user, as external commercial electric power, combined electric power generated by various power generation methods such as hydroelectric power generation, nuclear power generation, thermal power generation, etc., according to the status of demand and supply of the electric power.

Depending on the power generation method, the degree of influence of the power generation on the environment differs. As an index of the degree of influence of the power generation on the environment, for example, an amount of $CO_2$ emission may be used. For example, the solar light power generation does not significantly influence the environment, whereas the thermal power generation significantly affects the environment. In this manner, because the electric power is actually supplied by various power generation methods, it is difficult for the user to understand the degree of influence, on the environment, of the electric power used by the user.

An advantage of the present inventions is provision of an electric power visualization method and an electric power visualization device which allows understanding of the degree of influence, on the environment, of the electric power currently being used.

Solution to Problem

According to one aspect of the present invention, there is provided an electric power visualization method for visualizing content of electric power for input-side electric power or load-side electric power in an electric power management system which receives electric power generated by a plurality of power generation methods as the input-side electric power and supplies to a load as the load-side electric power based on the input-side electric power, the method comprising a display step in which the input-side electric power or the load-side electric power is classified into generated electric power of each of the power generation methods and is displayed with different display methods for each classification of the power generation method.

According to another aspect of the present invention, there is provided an electric power visualization device which visualizes content of electric power for an input-side electric power or load-side electric power in an electric power management system which receives electric power generated by a plurality of power generation methods as the input-side electric power and supplies to a load as the load-side electric power based on the input-side electric power, comprising a display unit which classifies the input-side electric power or the load-side electric power into generated electric power of each of the power generation methods, and displays with different display methods for each classification of the power generation method.

Advantageous Effects of Invention

According to various aspects of the present invention, in the electric power visualization, the electric power is classified into generated electric power for each power generation method and is displayed with different display methods for each classification of the power generation method. With this structure, for example, the degree of influence on the environment can be understood for the electric power which is currently being used.

BEST MODE FOR CARRYING OUT THE INVENTION

A preferred embodiment of the present invention will now be described in detail with reference to the drawings. In the following description, a lithium ion battery is explained as the electricity storage device, but alternatively, other secondary batteries may be employed. For example, a nickel-metal hydride battery, a nickel-cadmium battery, or the like may be employed.

In addition, in the following description, a common house will be explained as a system in which the electric power visualization device is used, but this is merely exemplary, and any system having an electricity storage device and a load may be employed, such as, for example, a shop, a factory, a large-scale facility, or the like. Moreover, as the electric power supply, solar light generated electric power and external commercial electric power will be described, but alternatively, a configuration may be employed in which the solar light power generation is not used and only the external commercial electric power is used.

In addition, a model of change of the electric power with elapse of time described below is merely exemplary, and other models may be employed. Moreover, a value of electric power (kW), a value of an amount of electric power (kWh), etc. described below are exemplary for the purpose of the explanation, and may be of different values depending on the contents or the like of the system in which the electric power visualization device is used. Furthermore, in the following, a household electronics load and nighttime charging of a vehicle-mounted secondary battery of an electric vehicle will be described as the load, but this configuration is merely exemplary, and other loads may be used.

In addition, in the following description, the same reference numerals are attached to similar elements in all drawings, and the explanation will not be repeated. Moreover, in the explanation in this text, the reference numerals which have been already used are referred to as necessary.

Figure 1:
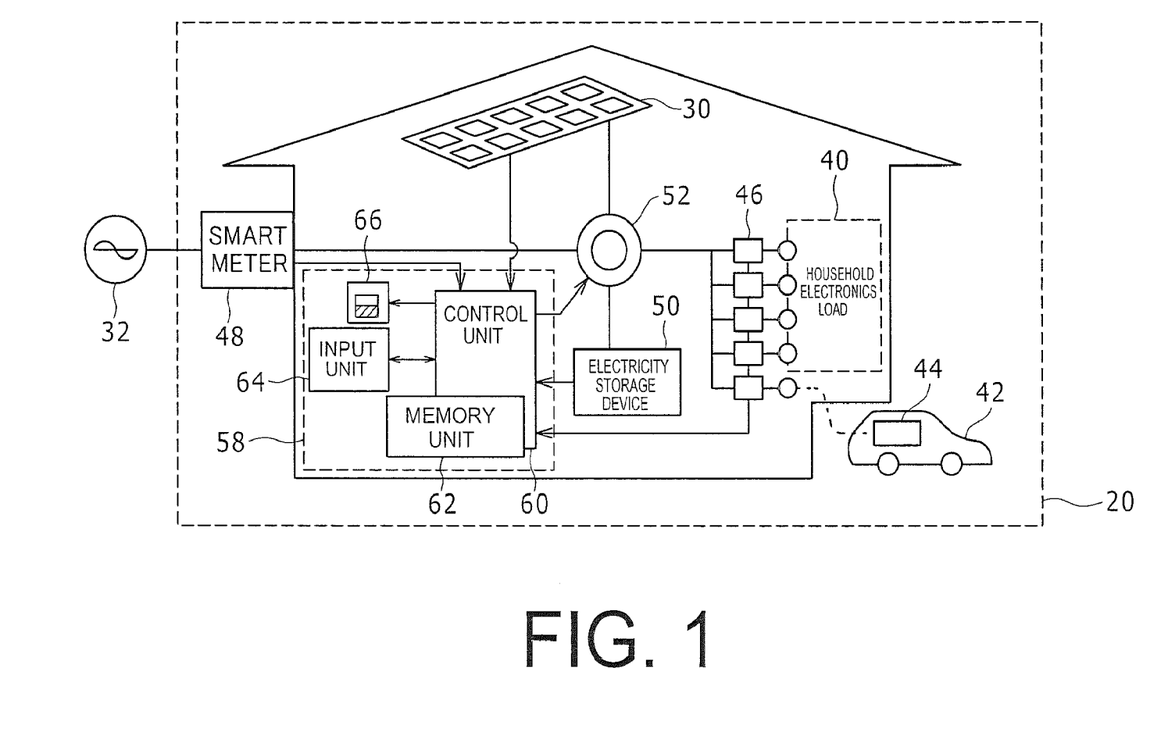
FIG. 1 is a diagram for explaining a house in which an electric power visualization device according to a preferred embodiment of the present invention is used.

FIG. 1 shows in detail a structure of a house 20 which is a system in which an electric power management device serving as an electric power visualization device is used. In FIG. 1, a thick solid line represents of electric power flow and a thin solid line with an arrow represents signal flow.

The house 20 is an electrified system which uses, as an electric power supply, electric power generated by a solar battery 30 and an external commercial electric power from an external commercial power supply 32 provided by an external electric power company, and which has, as a load which consumes the electric power, a household electronics load 40 such as lighting, kitchen equipment, an audio-video device, an air-conditioning device, hot-water supply equipment, and a vehicle-mounted secondary battery 44 of an electric vehicle 42 serving as a nighttime charge load.

The house 20 is a system which includes an electricity storage device 50 and an electric power management device 58, and which executes charge and discharge control to level the supply of electric power by the electric power supply according to a necessary electric power status of the loads of the household electronics load 40.

The solar battery 30 supplies electric power by solar light power generation to the necessary electric power of the load of the house 20, and the generated electric power is set in consideration of the electric power consumption for the entirety of one day of the house 20, the electric power consumption during daytime, which is the sunshine period, or the like. When the house 20 is a common house, the generated electric power of the solar battery 30 may be set, for example, to about 3 kW.

The external commercial power supply 32 is an alternating current electric power supply of a single phase or three phases, and is supplied from the external electric power company according to change in the demand and supply of the electric power and in a combination of electric power generated by various power generation methods such as hydroelectric power generation, nuclear power generation, and thermal power generation.

The household electronics load 40 is used for living in the house 20 as described above, and in general includes devices which are used in the daytime with a high frequency and which are used in the late nighttime with a low frequency. For example, if the electric power consumption history of the household electronics load 40 is studied in correspondence to the elapse of time in one day, the electric power consumption is the lowest around 5 o'clock in the morning, is gradually increased as time elapses, peaks between 10 o'clock AM and 2 o'clock PM, and is gradually reduced afterwards.

The vehicle-mounted secondary battery 44 is a battery equipped in the electric vehicle 42. Thus, during the traveling of the electric vehicle 42, the vehicle-mounted secondary battery 44 continues to discharge, and after the electric vehicle 42 returns to the house 20 in the late afternoon or night and is parked, a connection port provided in the house 20 is connected to the electricity supply port provided on the electric vehicle 42, and the vehicle-mounted secondary battery 44 is charged until the next morning. Therefore, if the electric power consumption history of the vehicle-mounted secondary battery 44 through the connection port of the house 20 is studied in correspondence to elapse of time during one day, the power consumption is approximately constant from around 10 o'clock at night when the charging is started until around 4 o'clock the next morning when the charging is completed. In other time periods, no electric power is consumed for the vehicle-mounted secondary battery 44.

An individual supply power detection device 46 is an electric power meter provided in each electricity plug of the house 20. A smart meter 48 is an electric power meter with a wireless transmission function, provided on the electricity supply port through which the external commercial electric power is introduced to the house 20. The individual supply power detection device 46 may use the smart meter as is, or use a current-probe type measurement device. Detection data of the individual supply power detection devices 46 and the detection data of the smart meter 48 are transmitted to the electric power management device 58, and are used as load power consumption history data.

With the use of the individual supply power detection device 46, it is possible to acquire the electric power consumptions of the loads such as the household electronics load 40 and the vehicle-mounted secondary battery 44 of the electric vehicle 42, fragmented, for example, for each electric plug. In addition, although the smart meter 48 which is connected to the external commercial power supply 32 cannot distinguish the electric power consumption for each type of load, the smart meter 48 can acquire an overall value of the external commercial electric power supplied from the external commercial power supply 32. Therefore, when the solar battery 30 is not used, or when the solar light generated electric power is small compared to the external commercial electric power, the detection data of the smart meter 48 can be assumed and used as the load power consumption history data.

The electricity storage device 50 is a secondary battery which can be charged and discharged and in which a large number of lithium ion storage batteries are combined to achieve a desired electricity storage capacity. Similar to the setting of the generated electric power of the solar battery 30, the electricity storage capacity of the electricity storage device 50 is set in consideration of the electric power consumption of an entire day of the house 20, the electric power consumption during daytime, which is a sunshine period, or the like. When the house 20 is a common house, the electricity storage capacity of the electricity storage device 50 may be set, for example, at 20 kWh.

An electric power conversion device 52 has a function to execute power conversion between an alternating current power of the external commercial power supply 32 and a direct current power of the electricity storage device 50, voltage conversion between a voltage of the solar battery 30 and a voltage of the electricity storage device 50, or voltage conversion between the electricity storage device 50 and the voltage of the load, and is a converter such as a bidirectional AC-DC converter, a bidirectional DC-DC converter, or the like. More specifically, the type of converter to be used is selected according to the nature of the conversion actually executed. The electric power conversion device 52 is connected to the electricity storage device 50 as described above, and with its operation causes charging and discharging of the electricity storage device 50. The charge and discharge control of the electricity storage device 50 by an operation of the electric power conversion device 52 is executed by the electric power management device 58.

The electric power management device 58 is a device which manages charge/discharge electric power at the house 20, and visualizes composition of the electric power from the viewpoint of the degree of influence on the environment. The electric power management device 58 comprises a control unit 60, a memory unit 62 which stores a charge and discharge control program or the like, an input unit 64 which inputs necessary data or the like, and a display unit 66 which displays an electric power green index to be described below, as the electric power visualization. These elements are connected to each other by an internal bus. The electric power management device 58 may be realized using a suitable computer.

The control unit 60 has a function to execute the charge and discharge control program to execute the charge and discharge control of the electricity storage device 50, and to level the external commercial electric power supplied from the external commercial power supply 32 to the house 20. More specifically, the control unit 60 has a function to acquire solar battery information related to a power generation state of the solar battery 30, acquire electricity storage device charge/discharge state data for the electricity storage device 50, and acquire load power consumption history data for the load, including data from the individual supply power detection device 46 and data from the smart meter 48. These data are acquired in association with the date and time of acquisition. In addition, the control unit 60 has a function to use the charge and discharge control program stored in the memory unit 62 to execute the charge and discharge control of the electricity storage device 50 through the operation of the electric power conversion device 52 according to the status of the necessary electric power of the load. With this function, the external commercial electric power from the external commercial power supply 32 is leveled.

The control unit 60 further has the following functions as the electric power visualization. Specifically, the control unit 60 has a chronological electric power calculation function for calculating a transition of the load electric power during one day, a transition of the solar battery generated electric power during one day, and a transition of the leveled external commercial electric power during one day, an electric power composition classifying function for classifying the electric power by the power generation method, an electric power green index calculating function for applying a green index as a standardized index defined in advance to each power generation method and calculating the electric power green index, and a display function for displaying the electric power green index. These functions can be realized by executing software, and, more specifically, by executing a corresponding electric power visualization program. Alternatively, a part of the above-described functions may be realized with hardware.

With regard to the content of the electric power visualization, in particular, the functions of the control unit 60 for the electric power visualization will now be described in detail with reference to FIGS. 2-10. For the electric power visualization, it is necessary to first calculate transition of load electric power during one day, transition of solar battery generated power, and transition of the leveled external commercial electric power. The leveling of the external commercial electric power is executed by the charge and discharge control of the electricity storage device 50. Thus, the procedure of the leveling of the external commercial electric power will first be described.

For the leveling of the external commercial electric power, storage battery charge/discharge state data, load power consumption history data, and solar battery power generation state data are acquired in the following manner.

The electricity storage device charge/discharge state data is acquired from the electricity storage device 50. More specifically, the data is acquired by receiving transmission of data detected by a current detection unit, a voltage detection unit, and a temperature detection unit provided in the electricity storage device 50. The data acquired from the electricity storage device 50 is stored in association with the date and time. This process is executed by an electricity storage device data acquisition function of the control unit 60. In addition, the load power consumption history data for the household electronics load 40 and the vehicle-mounted secondary battery 44 of the electric vehicle 42 are acquired. More specifically, the data is acquired by receiving transmission of detection data detected by the individual supply power detection device 46. The data acquired from the individual supply power detection device 46 is stored in association with the date and time. This process is executed by a load data acquisition function of the control unit 60. In addition, data is acquired from the solar battery 30 by receiving transmission of solar light power generation state data of the solar battery 30, and the acquired data is stored in association with the date and time.

Next, an optimum charge and discharge model is produced based on the acquired electricity storage device charge/discharge state data, the acquired load power consumption state data, and the acquired solar light power generation state data. More specifically, daily chronological load data which is data for each day of the load power consumption history associated with elapse of time during one day is produced, and daily chronological electricity storage device data, which is data for each day of the electricity storage device charge/discharge state associated with the elapse of time during one day, is produced. The production of these data is executed by editing the data stored in association with the date and time.

Next, based on these daily data, charging of the electricity storage device 50 by supply of electric power from the external commercial power supply 32 is promoted during a time period in which the load power consumption is low in the daily chronological load data, and the stored electric power of the electricity storage device 50 is discharged and the discharged electric power is supplied to the load during a time period in which the load power consumption is high in the daily chronological load data, so that the amount of charge electric power and an amount of discharge electric power of the electricity storage device 50 become equal to each other throughout the day. Here, in the charging and discharging of the electricity storage device 50, the daily chronological electricity storage device data, which is electricity storage device charge/discharge state data of each point of time, is referred to, to charge the electricity storage device 50 when the state of charge is less than or equal to a charge limit value which is defined in advance, and to discharge the electricity storage device 50 when the state of charge is greater than or equal to a discharge limit value which is defined in advance, in order to prevent excessive charge and excessive discharge of the electricity storage device 50. In this manner, a leveled charge and discharge model in which the peak of the electric power supply from the external commercial power supply 32 during one day is inhibited and leveled is produced. The leveled charge and discharge model corresponds to the optimum charge and discharge model.

The data which is the most basic for the leveling of the external commercial electric power is the above-described daily chronological load data. The daily chronological load data is preferably not data for only one day, but is based on data of a few days. In order to process the data of a few days into one daily chronological load data, methods such as simple averaging, weighted averaging, moving averaging, etc. may be employed. For the weighting, if a seasonal factor characteristic is known in advance, a weight may be employed with a gradual increment or a gradual decrement on data of each day corresponding to the progress of the seasons and according to the characteristic.

Figure 2:
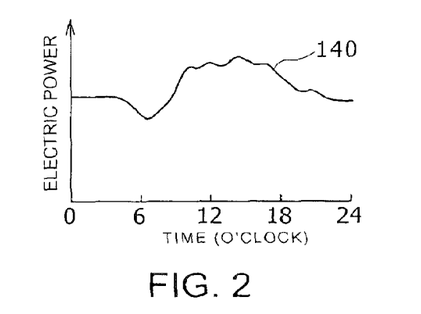
FIG. 2 is a diagram for explaining a load electric power characteristic line indicating transition of load electric power of one day in a preferred embodiment of the present invention.

FIG. 2 is a diagram showing the daily chronological load data determined in this manner. A horizontal axis of FIG. 2 represents a time during one day and a vertical axis represents electric power. With this data, the transition of the power consumption of the load during one day can be understood in the house 20, and thus this data will hereinafter be called a load electric power characteristic line 140.

In the case of the house 20, because the solar light generated power by the solar battery 30 can be used, first, the solar light generated power by the solar battery 30 is provided for the necessary electric power of the load throughout the day, and the deficit is compensated for by the external commercial electric power from the external commercial power supply 32. The external commercial electric power is leveled through charging and discharging of the electricity storage device 50 so that the external commercial electric power has a constant electric power value throughout the day.

In this case, first, at each point in time, a value of a solar light generated power characteristic line 104 is subtracted from the value of the load electric power characteristic line 140. The result of subtraction is shown in FIG. 3 as a subtracted electric power characteristic line 150.

Next, the subtracted electric power characteristic line 150 is leveled by the charge and discharge control of the electricity storage device 50. That is, the electricity storage device 50 is charged by the supply of electric power from the external commercial power supply 32 during a time period in which the load power consumption is low during one day, and the electric power stored in the electricity storage device 50 is discharged and supplied to the load during a time period in which the load power consumption is high, so that the amount of charge electric power and the amount of discharge electric power become equal to each other throughout one day.

More specifically, using the subtracted electric power characteristic line 150, a line of a constant electric power value is drawn, an area in which the subtracted electric power characteristic line 150 is lower than the constant electric power line is set as the amount of charge electric power, an area in which the subtracted electric power characteristic line 150 is higher than the constant electric power line is set as the amount of discharge electric power, and the constant electric power line is moved up and down so that the area under the line and the area above the line become equal to each other. The electric power line which causes the area below the line and the area above the line to become equal to each other shows a value of the external commercial electric power which balances the amount of charge electric power and the amount of discharge electric power of the electricity storage device 50 through one day.

Figure 3:
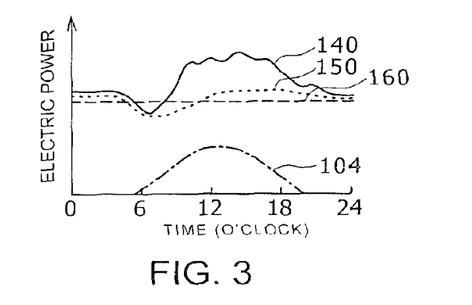
FIG. 3 is a diagram which shows a solar light generated electric power characteristic diagram showing transition of solar light generated electric power in one day for FIG. 2, and for explaining an external commercial electric power characteristic line showing transition of external commercial electric power of one day when the solar light generated electric power is supplied to a load electric power and the deficit is supplemented by the external commercial electric power.

FIG. 3 shows, with a broken line, an external commercial electric power characteristic line 160 thus determined. The external commercial electric power has a same electric power value throughout one day. In this manner, with a suitable charge and discharge control of the electricity storage device 50, the external commercial electric power can be leveled to a constant value even when the load electric power changes. The optimum charge and discharge model is produced in this manner.

Figure 4:
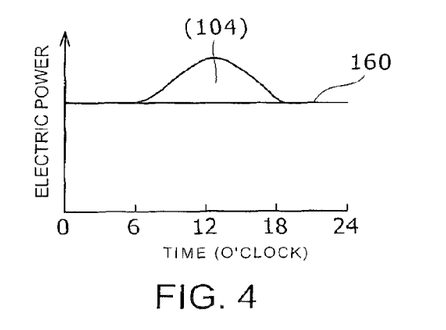
FIG. 4 is a diagram for explaining electric power supplied to the load in one day in FIG. 3.

When the external commercial electric power is leveled and the external commercial electric power characteristic line 160 serving as the optimum charge and discharge model is calculated, next, an input-side electric power in which an external commercial electric power which is leveled and set to a constant value and the solar light generated power are added is calculated. More specifically, an electric power supply value of the external commercial electric power is acquired from the smart meter 48 and an electric power supply value of the solar light generated power is acquired with a suitable electric power meter, and the acquired values are added. FIG. 4 shows the input-side electric power in a form where the electric power of the solar light generated power characteristic line 104 is added to the external commercial electric power characteristic line 160.

Figure 5:
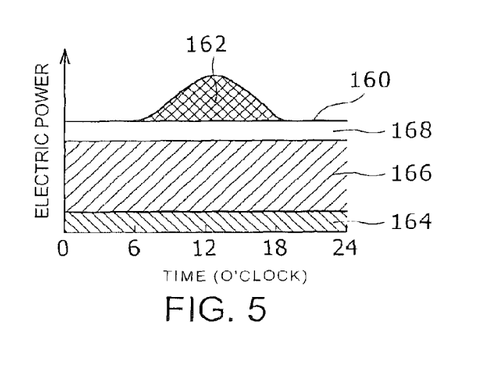
FIG. 5 is a diagram for explaining electric power composition of electric power of FIG. 4 classified by power generation methods.

FIG. 5 shows the input-side electric power classified by the power generation methods. Here, the power generation methods include the solar light power generation, wind power generation, hydroelectric power generation, thermal power generation, and nuclear power generation. There also are known, as experimental methods, geothermal power generation and tidal power generation. In Japan, power generation of approximately constant electric power value is executed throughout one day by hydroelectric power generation and nuclear power generation, and thermal power generation is employed during a high-demand period during the daytime. A combination of the power supply corresponding to the change of demand of the electric power may differ depending on the situation of the electric power company or the like, but an example model which is known as one of the best mixing models is 10% hydroelectric power generation, 30% nuclear power generation, and 60% thermal power generation during the highest demand period of the electric power during the daytime. For the amount of electric power throughout one day, a model is 15% hydroelectric power generation, 50% nuclear power generation, and 35% thermal power generation.

Because there is a growing interest in the influence of power generation on the environment, each electric power company is expected in the future to notify the user of a ratio of the power generation methods in the supply electric power, but here, the power generation method is deduced for the classification for the external commercial electric power based on the above-described data of the best mixing model.

Because the input-side electric power of FIG. 4 uses solar light power generation in the period of high demand of electric power during the daytime, the burden of the external commercial electric power is correspondingly lowered. If hydroelectric power generation and nuclear power generation are considered as having constant electric power values throughout one day, in the external commercial electric power characteristic line 160 which is leveled to a constant value, the thermal power generation which compensates for the insufficiency of the hydroelectric power generation and the nuclear power generation is also a constant value throughout one day. FIG. 5 shows the input-side electric power classified by the power generation method according to such an idea. Here, the input-side electric power is classified into solar light generated electric power 162, hydroelectrically generated electric power 164, nuclear generated electric power 166, and thermally generated electric power 168. The process up to this point is executed by an electric power composition classification function of the control unit 60.

When the input-side electric power is classified into generated electric power for each power generation method in this manner, a standardized index which is defined in advance is applied to each of the power generation methods. For the standardized index, the standardized index value is set higher for a power generation method with a lower degree of influence on the environment. In other words, a high standardized index value is set for a power generation method having a low degree of influence on the environment and a low standardized index is set for a power generation method having a high degree of influence on the environment. As an environmental influence index which shows the degree of influence on the environment, an amount of $CO_2$ emission or the like may be used.

Figure 6:
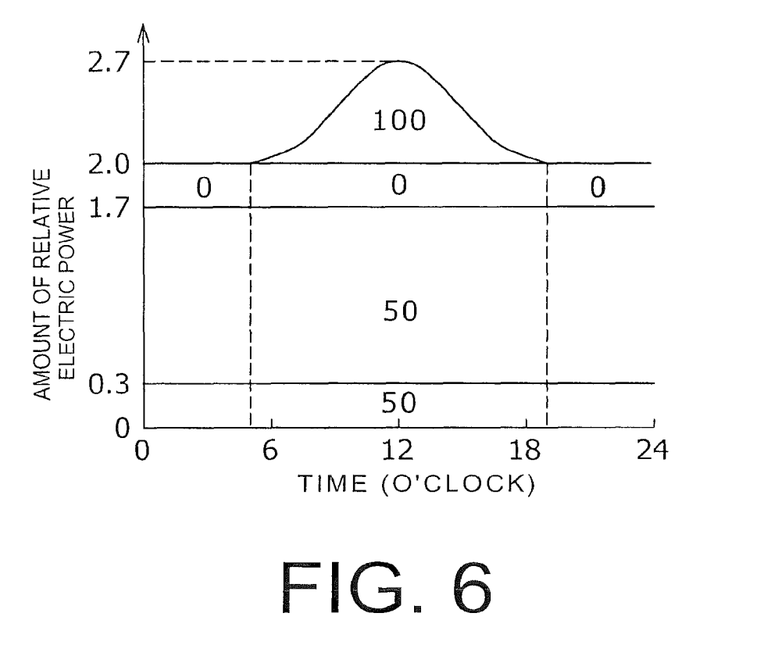
FIG. 6 is a diagram for explaining application of a green index as a standardized index corresponding to the power generation methods of FIG. 5.
Figure 7:
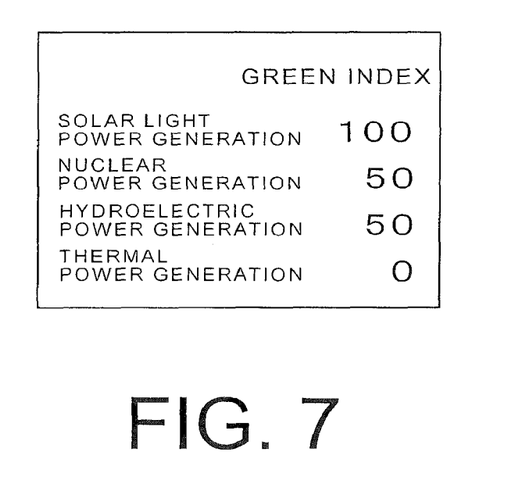
FIG. 7 is a diagram for explaining a green index as the standardized index in a preferred embodiment of the present invention.

FIG. 6 is a diagram showing setting of a green index shown in FIG. 7 as the standardized index and application of the green index for each power generation method. A horizontal axis represents time in one day, and a vertical axis represents electric power, and here, a relative electric power is shown as a relative value. The green index is standardized with 100 as a maximum value, and with the solar light power generation having a green index of 100, the nuclear power generation and the hydroelectric power generation having a green index of 50, and the thermal power generation having a green index of 0. Alternatively, a standardized index of other contents may be employed.

Next, an electric power green index is calculated using FIG. 6. The electric power green index refers to a value acquired by multiplying the classified generated electric power by a corresponding green index at each point in time in one day. For example, in FIG. 6, from 0 o'clock AM to 5 o'clock AM, (relative electric power of 0.3 for hydroelectric power generation)×(green index of 50 for hydroelectric power generation)+(relative electric power of 1.4 for nuclear power generation)×(green index of 50 for nuclear power generation)+(relative electric power of 0.3 for thermal power generation)×(green index of 0 for hydroelectric power generation)=85 (kW·green index) is calculated. At noon, an additional value of (relative electric power of 0.7 for solar light power generation)×(green index of 100 for solar light power generation)=70 (kW·green index) is added to this value. The process of calculation of the electric power green index is executed by an electric power green index calculation function of the control unit 60.

Figure 8:
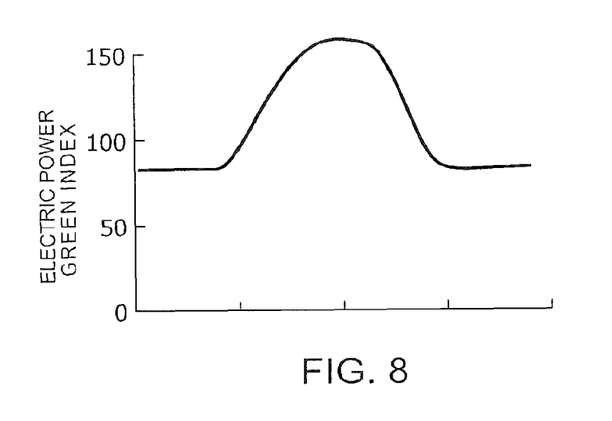
FIG. 8 is a diagram showing an electric power green index in a preferred embodiment of the present invention.

FIG. 8 is a diagram showing a change of the electric power green index with elapse of time during one day. A horizontal axis represents time during one day and a vertical axis represents the electric power green index. As shown, it can be understood that in the period in which the solar light power generation can be used, the electric power green index is increased.

Figure 9:
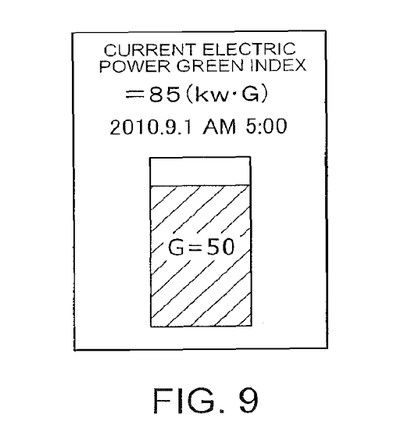
FIG. 9 is a diagram showing an example display screen visualizing and displaying the electric power green index in a preferred embodiment of the present invention.
Figure 10:
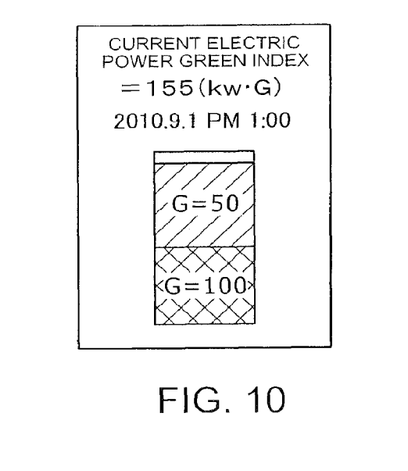
FIG. 10 is a diagram showing another example display screen visualizing and displaying an electric power green index in a preferred embodiment of the present invention.

FIGS. 9 and 10 are diagrams showing examples of display screens when the electric power green index is displayed on the display unit 66. FIG. 9 is an electric power green index display screen at 5 o'clock AM and FIG. 10 is an electric power green index display screen at 1 o'clock PM. FIGS. 9 and 10 display, along with the value of the electric power green index, the ratios of the electric power in the input-side electric power having a high green index. The display of the ratio is shown by an area ratio within a frame of a certain size, and the green index is shown with a density of the green color. For example, the green index of 100 may be shown with a dark green color, the green index of 50 may be shown with a light green color, and the green index of 0 may be shown with the background color. The process to display the electric power green index is executed by a display function of the control unit 60.

In the case of 5 o'clock AM in FIG. 9, as shown in FIG. 6, the input-side electric power is a relative electric power of 2.0, and the electric powers of the hydroelectric power generation and the nuclear power generation having the green index of 50 are relative electric power of 1.7. Thus, a ratio of the electric power with the green index of 50 is shown as 85% of the area of the overall frame. The description of G=50 indicates the green index of 50. In the above-described example case, the portion of G=50 is shown with a light green color. Here, the electric power green index electric power=85 (kW·green index).

In the case of 1 o'clock PM shown in FIG. 10, as shown in FIG. 6, the input-side electric power has relative electric power of 2.7, with the electric powers of the hydroelectric power generation and the nuclear power generation with the green index of 50 being relative electric power of 1.7 and the electric power of the solar light power generation with the green index of 100 being relative electric power of 0.7. Therefore, these power generation methods are displayed with corresponding area ratios. The description of G=100 indicates the green index of 100, and, in the above-described example case, the portion of G=100 is shown with a dark green color. Here, the electric power green index electric power=155 (kW·green index)

The above-described electric power composition visualization is for the solar light generated electric power and the leveled external commercial electric power, and thus is an electric power composition visualization of the input-side electric power for the house 20. In addition, the electric power composition of the storage battery electric power can be visualized, or the electric power composition of the load-side electric power can be visualized.

With regard to the storage battery electric power, it is possible to visualize the power generation methods from which the amount of stored electric power currently stored in the electricity storage device 50 is derived. In this case, it is possible to know whether the electric power charging the electricity storage device 50 is supplied from the external commercial power supply 32 or from the solar battery 30 based on the control state of the electric power conversion device 52, and thus the electric power can be classified for each power generation method. With regard to the electric power discharged from the electricity storage device 50 to the load, it is possible to classify the discharge electric power for each power generation method by presetting that, as a presumption of the visualization calculation, which electric power generated by which power generation methods the electric power is discharged with higher priority. As the order of priority of discharge, a "first-in first-out" method in which the electric power is discharged in the order from the earliest charged electric power may be used as the presumption of the visualization calculation. In this manner, the charge electric power is classified for each power generation method and the discharge electric power is classified at each point in time for each power generation method, to classify for each power generation method the amount of stored electric power at each point in time, and the result is displayed.

The load-side electric power is an electric power in which the charge electric power of the storage battery is subtracted from the input-side electric power, or an electric power in which the discharge electric power of the storage battery is added to the input-side electric power. Therefore, the classification of the power generation method of the load-side electric power can be executed based on the above-described classification of the power generation method of the input-side electric power and the classification of the power generation method of the storage battery electric power, and the result is displayed. In some cases, only the storage battery electric power becomes the input-side electric power or the storage battery electric power becomes the load-side electric power.

In this manner, the electric power green index at each point in time and the green index ratio by the electric power composition are displayed on the display unit 66, and thus the user can visually understand the influence of the currently used electric power on the environment.

Figure 11:
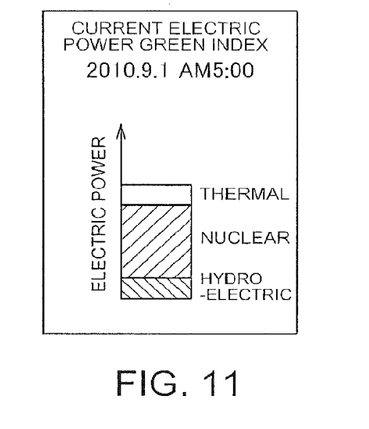
FIG. 11 is a diagram showing an example display screen which displays a current status of electric power classified by each power generation method in a preferred embodiment of the present invention.
Figure 12:
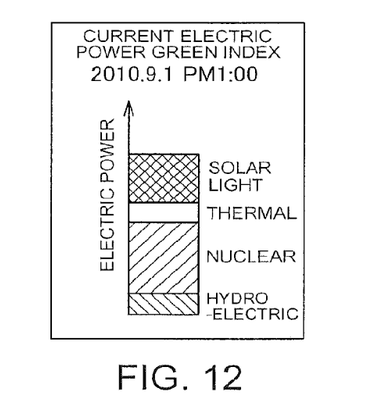
FIG. 12 is a diagram showing another example display screen which displays a present status of electric power classified by each power generation method in a preferred embodiment of the present invention.
Figure 13:
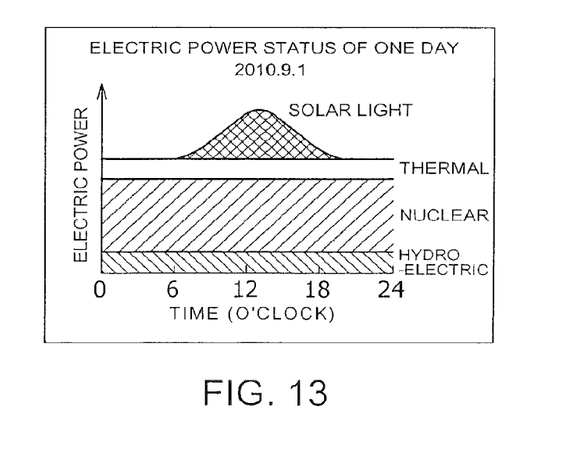
FIG. 13 is a diagram showing an example display screen which displays an electric power status of one day classified by each power generation method in a preferred embodiment of the present invention.

In the above description, the status of the green index is visualized, but alternatively, the category of classification of the power generation method of the electric power may be displayed. FIG. 11 is a diagram showing an example of display screen corresponding to FIG. 9 and displaying the current status of the electric power categorized for each power generation method. Here, a status when only the external commercial electric power is used is displayed. In these diagrams, a vertical axis represents the electric power. FIG. 12 shows a status of another example at another time in which the solar light generated electric power is also used. Alternatively, the electric power status throughout one day may be displayed categorized for each power generation method. FIG. 13 shows an example of such a display. Here, a vertical axis represents the electric power and a horizontal axis represents the time during one day.

In the above description, the electric power management device 58 of the house 20 has the calculation function for electric power composition visualization and the display unit 66 displays the visualization calculation result, but alternatively, a configuration may be employed in which a device outside of the house 20 executes the calculation for the electric power composition visualization for the house 20 and transmits the result to the electric power management device 58 of the house 20, and the display unit 66 displays the result. In this case, the display unit 66 corresponds to the device which visualizes the electric power composition for the house 20. As the device outside of the house 20, an electric power management server which is connected to the electric power management device 58 of the house 20 through a network may be employed, or an electric power composition calculating device of the external electric power company having the external commercial power supply 32 may be employed.

INDUSTRIAL APPLICABILITY

The electric power visualization method and the electric power visualization device of the present invention can be used for a house, a factory facility, or the like having an electricity storage device and a load which is driven by an electric power supplied at least by the electricity storage device.

The invention claimed is:
1. An electric power visualization method for visualizing content of electric power for input-side electric power or load-side electric power in an electric power management system which receives electric power generated by a plurality of power generation methods as the input-side electric power and supplies to a load as the load-side electric power based on the input-side electric power, the method comprising:
- a display step in which the input-side electric power or the load-side electric power is classified into generated electric power of each of the power generation methods and is displayed with different display methods for each classification of the power generation method,
- wherein the electric power management system sets electric power stored in an electricity storage device which is charged based on the input-side electric power as a storage battery electric power, and supplies to the load as the load-side electric power based on the input-side electric power and the storage battery electric power, and
- wherein in the display step, the storage battery electric power is classified into the generated electric power of each power generation method based on data of one of best mixing models, and is displayed with different display forms for each classification of the power generation method.

2. The electric power visualization method according to claim 1, wherein
the input-side electric power includes an external commercial electric power and a solar light generated electric power generated by a solar battery through a solar light power generation method.

3. The electric power visualization method according to claim 2, wherein
the external commercial electric power includes generated electric power of a plurality of power generation methods.

4. The electric power visualization method according to claim 3, wherein
in the display step, the storage battery electric power is displayed as the input-side electric power.

5. The electric power visualization method according to claim 4, wherein
in the display step, for each of the plurality of power generation methods of the external commercial electric power and the solar light power generation method, a standardized index which is standardized and which indicates a degree of influence on the environment according to a predefined standard is used, with a higher standardized index being set for a power generation method with a lower degree of influence on the environment, at least one of the input-side electric power, the storage battery electric power, and the load-side electric power is classified into generated electric power of each power generation method, and a result acquired by multiplying the classified generated electric power by a corresponding standardized index is displayed.

6. The electric power visualization method according to claim 5, further comprising:
- a commercial electric power supply value acquisition step in which an electric power supply value of the external commercial electric power is acquired with elapse of time;
- a solar light generated electric power supply value acquisition step in which an electric power supply value of the solar light generated electric power is acquired with the elapse of time;
- a commercial electric power classification step in which the acquired electric power supply value of the external commercial electric power is classified into the generated electric power of each power generation method according to a predefined classification procedure; and
- an output step in which, for the input-side electric power, each of the generated electric power of each of the plurality of power generation methods of the external commercial electric power and the generated electric power of the solar light power generation method corresponding to the electric power supply value of the solar light generated electric power is multiplied by the standardized index corresponding to each power generation method according to a difference in the power generation method, and a result value is output, wherein
- in the display step, the result which is output with the elapse of time is displayed on a display unit so as to be classified for each power generation method.

7. A device which visualizes content of electric power for input-side electric power or load-side electric power in an electric power management system which receives electric power generated by a plurality of power generation methods as the input-side electric power and supplies to a load as the load-side electric power based on the input-side electric power, the device comprising:
- a display unit which classifies the input-side electric power or the load-side electric power into generated electric power of each of the power generation methods, and displays with different display methods for each classification of the power generation method,
- wherein the electric power management system sets electric power stored in an electricity storage device which is charged based on the input-side electric power as a storage battery electric power, and supplies to the load as the load-side electric power based on the input-side electric power and the storage battery electric power, and
- wherein the display unit classifies the storage battery electric power into the generated electric power of each power generation method based on data of one of best mixing models, and displays with different display forms for each classification of the power generation method.

8. The electric power visualization device according to claim 7, wherein
the input-side electric power includes an external commercial electric power and a solar light generated electric power generated by a solar battery through a solar light power generation method.

9. The electric power visualization device according to claim 8, wherein
the external commercial electric power includes generated electric power of a plurality of power generation methods.

10. The electric power visualization device according to claim 9, wherein
the display unit displays the storage battery electric power as the input-side electric power.

11. The electric power visualization device according to claim 10, wherein
the display unit uses, for each of the plurality of power generation methods of the external commercial electric power and the solar light power generation method, a standardized index which is standardized and which indicates a degree of influence on the environment according to a predefined standard, with a higher standardized index being set for a power generation method with a lower degree of influence on the environment, classifies at least one of the input-side electric power, the storage battery electric power, and the load-side electric power into the generated electric power of each power generation method, and displays a result acquired by multiplying the classified generated electric power by a corresponding standardized index.

12. The electric power visualization device according to claim 11, further comprising:
a commercial electric power supply value acquisition unit which acquires an electric power supply value of the external commercial electric power with elapse of time;
a solar light generated electric power supply value acquisition unit which acquires an electric power supply value of the solar light generated electric power with the elapse of time;
a commercial electric power classification unit which classifies the acquired electric power supply value of the external commercial electric power into the generated electric power of each power generation method according to a predefined classification procedure, and
an output unit which multiples, for the input-side electric power, each of the generated electric power of each of the plurality of power generation methods of the external commercial electric power and the generated electric power of the solar light power generation method corresponding to the electric power supply value of the solar light generated electric power by the standardized index corresponding to each power generation method according to a difference in the power generation method, and outputs the result value, wherein
the display unit displays the result which is output with the elapse of time so as to be classified for each power generation method.

* * * * *